Oct. 13, 1959     R. D. HAMILTON     2,908,379
CONVEYOR
Filed Nov. 25, 1957     2 Sheets-Sheet 1
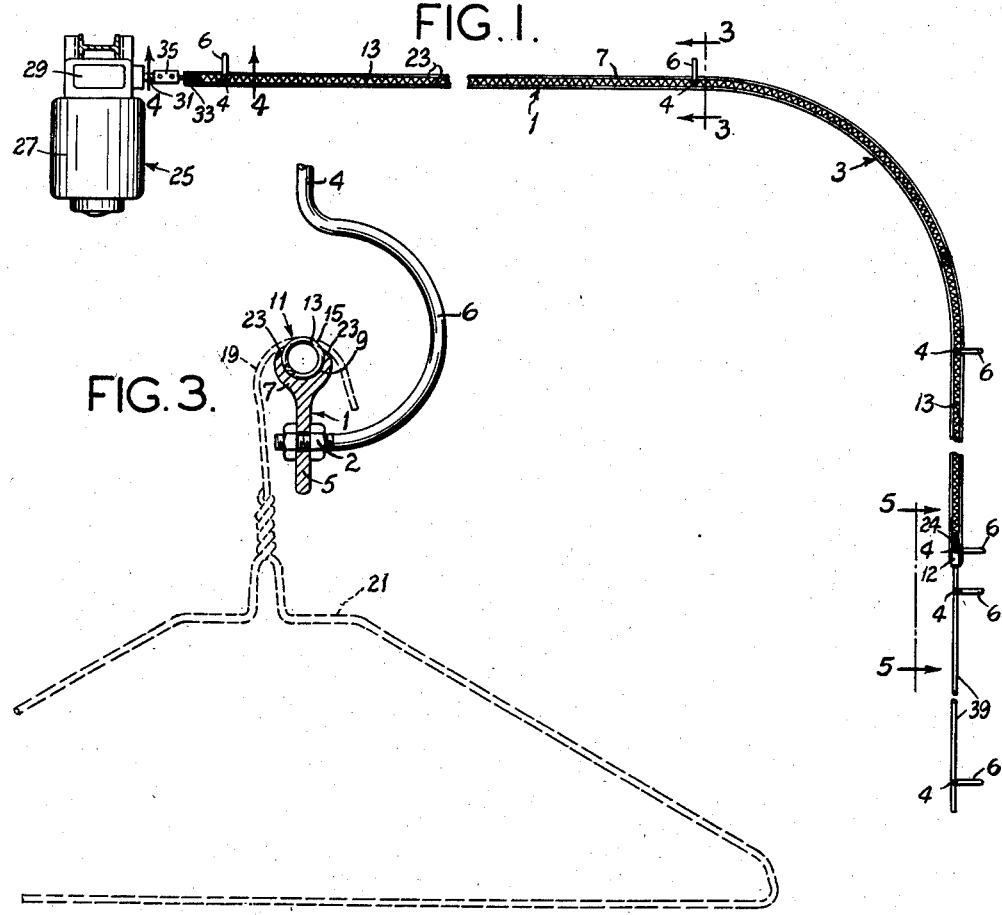
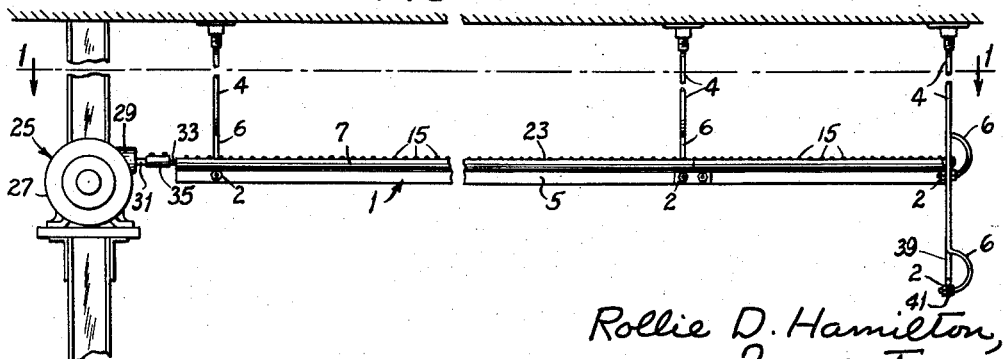
Rollie D. Hamilton,
Inventor.
Koenig and Pope,
Attorneys.

Oct. 13, 1959 — R. D. HAMILTON — 2,908,379
CONVEYOR
Filed Nov. 25, 1957 — 2 Sheets-Sheet 2

Rollie D. Hamilton,
Inventor.
Koenig and Pope,
Attorneys.

United States Patent Office 2,908,379
Patented Oct. 13, 1959

2,908,379

CONVEYOR

Rollie D. Hamilton, Affton, Mo., assignor to Auto Express Rail, Inc., St. Louis, Mo., a corporation of Missouri Application November 25, 1957, Serial No. 698,745

4 Claims. (Cl. 198—213)

This invention relates to conveyors, and with regard to certain more specific features, to screw-type conveyors for transporting articles.

Among the several objects of the invention may be noted the provision of a simple, low-cost, light-weight, smoothly operating spring-screw type conveyor adapted to transport objects along a continuous supporting rail; the provision of a conveyor which may be conveniently assembled from a few simple parts to convey articles along paths of any of various forms, curved or straight; the provision of a conveyor of the class described which is adapted automatically to relieve adverse conditions of frictional overload and jamming such as might be caused by a large number of curves in the conveyor, or misapplication to the conveyor or any failure to remove therefrom articles being transported; the provision of a spring-screw conveyor construction wherein a spring screw, while exposed in its guide to provide means for effecting a releasable connection with articles to be transported, is positively held in proper alignment in said guide and which, by means of a braking arrangement, is prevented from having a chattering action; and the provision of a conveyor of this class which has simple automatically tightening driving connections between its spring screw and its driving and brake means, said spring screw being adapted automatically to minimize frictional resistance to rotation in its guide. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, Fig. 1 is a plan view of the conveyor, as viewed from plane 1—1 of Fig. 2;

Fig. 2 is a front elevation of Fig. 1;

Fig. 3 is an enlarged cross section taken through a guide on line 3—3 of Fig. 1 and illustrating application of an article (clothes hanger, for example) to be transported;

Corresponding reference characters indicate corresponding parts throughout the several views of the drawings.

Figure 7:
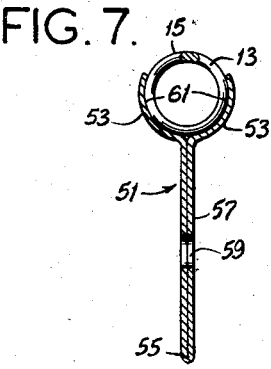
Fig. 7 is an enlarged cross section similar to parts of Fig. 3, showing an alternative form of guide.

Referring now more particularly to Figs. 1–4, there is shown at numeral 1 a guide channel which may be straight or curved or both, as desired. For purposes of illustration, one of the many curves that may be used is shown at numeral 3. Such curves are common requirements in conveyors. The channel 1 may be made of any suitable deformable material such as a soft metal (aluminum, for example) extrusion, as shown, or if desired, of sheet metal or the like such as shown in Fig. 7, to be referred to below. Specifically, the channel 1 consists of a supporting and vertically stiffening flange or rib 5 (Fig. 3), and a head 7. The flange 5 provides for attachments 2 with overhead supports 4, which are looped as shown at 6 in order substantially to clear the head 7. While deformable transversely along with the head 7, the flange 5 stiffens the channel 1 in a vertical direction so as to function as a beam in both its straight and curved portions.

The head is formed with a groove 9 of round cross section but subtending a circular arc of more than 180°, thus forming at the top an open slot 11 of substantial width. Located in the groove 9 is a single, interiorly empty coil spring 13, the outside diameter of which is slightly less than the inside diameter of the partially circular slot 9, so as to provide therein a running rotary fit. It will be understood that the fit is not so loose as to allow the spring 13 to escape from the groove 9 under any conditions of use. The pitch of the coil spring 13 is substantial, as indicated more particularly in Figs. 4 and 5, thus leaving between them substantial spaces 17.

The arrangement is such that fairly widely spaced loop portion 15 of the spring are exposed above the slot 11 and the spaces 17 between the loops and within them are adapted to accept hooked portions 19 of hangers such as illustrated at 21. Coat hangers are shown, but obviously supports for any other articles might be used. The hooked portions 19 preferably rest upon the upper converging margins 23 of the channel 1. However, as may sometimes be desired, the ends of the hooks, or projecting parts of other articles, may be made to extend between the spring loops and into the empty space within the spring, for a more positive driving connection. Thus if the spring is rotated around its axis in its location within the groove, the hooked portions 19 will be pushed along the groove. Inasmuch as the groove 9 sufficiently subtends more than 180°, the coil spring 13 is prevented from jumping out of the slot of the groove in which it is rotatable.

An advantageous feature of the arrangement described is that any friction encountered, tending to resist rotation and to wind up the spring, causes the outside diameter of the spring to become less, so as to increase the clearance between the rotating spring and the groove 9. This not only reduces the friction but tends to maintain free rotary action, particularly in straight runs of the conveyor. In the usual case in which one or more curves such as 3 are employed, added frictional resisting means is employed in the form of a brake, which will be described below.

In order to rotate the spring 13, a drive 25 is employed. This includes a motor 27 and a gear-reduction unit 29, the output shaft of which is shown at 31. At 33 is shown a drive pin or mandrel, which is coupled to the motor drive shaft 31 by means of coupling 35. The center line of this drive pin 33 is coaxial with the center line of the spring 13. The diameter of pin 33 is slightly larger than the inside diameter of the spring, so that by forcing pin 33 into the spring axially a snug clutching fit will result. Winding of the spring is such around the drive pin 33, relative to its driving rotation, that when frictional resistance against spring rotation is met with, the wind-up of the part 37 of the spring 13 around pin 33 reduces the spring diameter and tightens the clutching effect. This clutching action may be maximized by knurling pin 33 as indicated on Fig. 4. Obviously, the pin 33 could itself be constituted by the motor shaft 31 if the motor shaft is of correct diameter for the purpose.

An advantage of the coil spring type of screw lies in the fact that if the forward motion of any one or more hooked portions, when mounted as shown in Fig. 3, should be interfered with, such as by placing a hanger 21 in a reversed position to that shown in Fig. 3 and having it strike a supporting loop 6, then the adjacent loop of the spring simply moves repeatedly under a hooked portion 19 at the point of stoppage.

Figure 4:
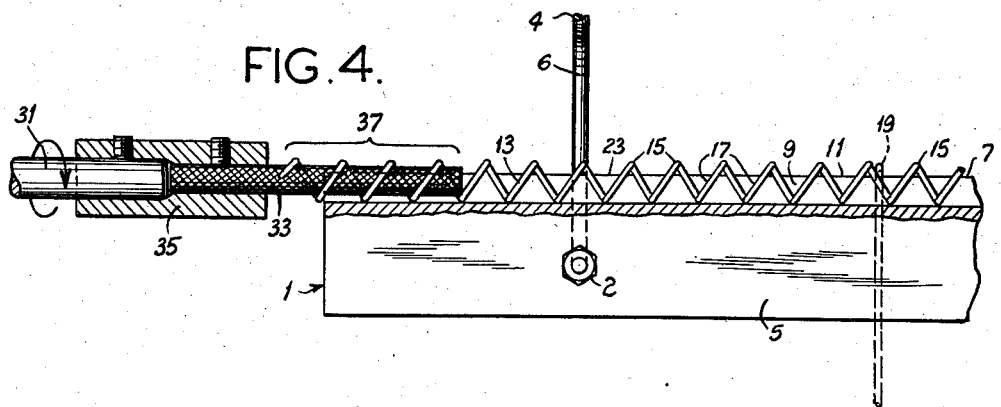
Fig. 4 is an enlarged axial section taken on line 4—4 of Fig. 1.
Figure 5:
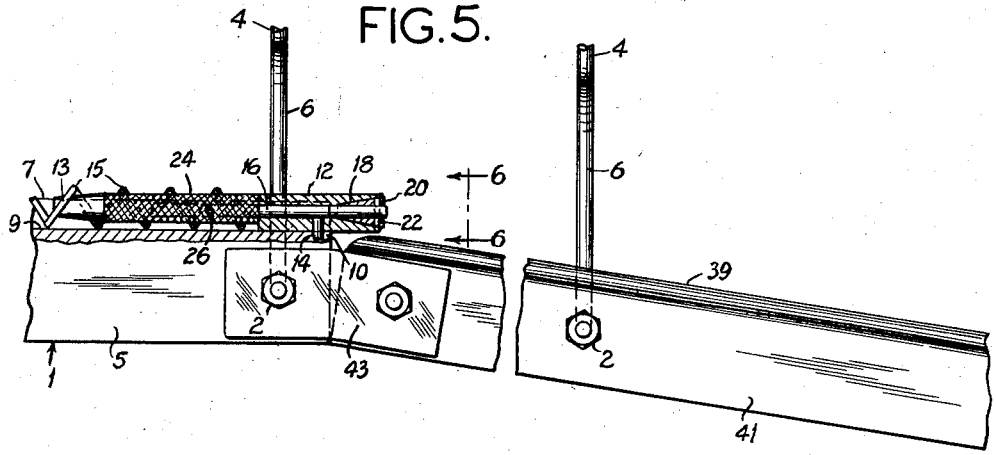
Fig. 5 is an enlarged section taken on line 5—5 of Fig. 1.
Figure 6:
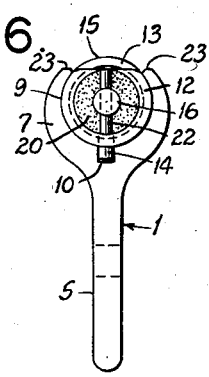
Fig. 6 is an end view of a brake mechanism as viewed from line 6—6 of Fig. 5.

Figs. 5 and 6 show how the far end of the spring from the driving means 25 is arranged at the end of the slot 11. At this point a notch 10 is arranged in the bottom of the slot. Into the end of the slot is inserted a stationary brake member 12 having a cross-pin 14 extending into the notch 10. The stationary member 12 is longitudinally bored out to receive a rotatable shaft 16. The bored-out portion includes a female conical portion 18. A male brake cone 20 is attached to the outer end of the shaft 16 by means of a pin 22. To the inner end of the shaft 16 is fastened a mandrel 24, being pinned thereto as indicated at 26. This mandrel 24, like the drive mandrel 33, has the outer end of the spring 13 surrounding it to form a clutching, driving connection, and may be knurled to improve the driving connection.

In assembling the spring 13 with the mandrels 24 and 33, it is preferable that the spring be stretched somewhat, so as to place it in axial tension, thereby drawing the conical male brake member 20 into engagement with the female conical stationary brake member 18. The resulting axial pull may be for example 10 to 20 lbs. This force is applied to the cone 20 so as to bring it into engagement with cone 18. The brake members are composed of suitable materials, such as to set up a frictional resisting torque between them in their condition of pressure engagement brought about by tension in the spring 13. For example, one of the members may be metal and the other composed of a suitable nonmetallic frictional braking material, such as is used for brake linings in general. The brake 18, 20 is continuously operative when the spring 13 is rotated, to apply said resisting torque at mandrel 24 while the other end of the spring is being driven by mandrel 33. Thus when the driving device 25 is started, the spring 13 will be preliminarily torsionally wound up from 3 to 6 turns and maintain such a condition as it rotates. The purpose of this is to prevent chattering action of the spring 13 in its slot 11, particularly in the cases in which it traverses one or more curves. Without a brake such as above described, any irregularities in the spring or the slot, particularly in curves, might in the absence of the brake result in a chattering condition. The brake avoids such action.

Fig. 5 also shows how a solid sloping rail 39 may be provided, having a sloping flange 41 for accepting one or more loops 6. A coupling 43 is employed between flanges 5 and 41. Thus the hooked portions 19, driven over the brake parts, will drop down onto the sloping rail 39, to slide down into whatever position is desired, or in the alternative, to collect upon the rail 39, to be taken off in due time.

In Fig. 7 is shown an alternative form of channel 51 composed of sheet metal, shaped with marginal partial grooved portions 53, and folded at 55 to provide a multiply supporting flange 57 in which openings 59 are provided for the hanger attachments 2. This brings together and holds the portions 53 to form a groove 61 subtending more than 180° for reception of the spring 13 in the manner above described. This channel 51 is also deformable into any desired curved shape.

Examples of appropriate dimensions are as follows: diameter of the groove 9 or 61, 5/8″; outside diameter of the spring 13, 5/8″ minus clearance; wire diameter, approximately 7/64″; angle subtended by the groove 9, 240° or less to provide a wide slot, but sufficiently greater than 180° to hold in the spring; thickness of the flange in the extruded aluminum form of Fig. 3, 3/16″; sheet-metal channel in the form of Fig. 7, approximately 14 to 16 U.S. standard gage. These dimensions permit a satisfactory mounting of the channel members, both along straight-ways and curves.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A conveyor comprising a rotatable coil spring having substantial spaces between its coiled loops, a guide channel embracing said spring throughout an angle exceeding 180° of the circular form of the spring but substantially exposing spaced portions of said loops, whereby articles may be transported by the exposed portions of the spring upon rotation thereof, means toward one end of the spring and channel adapted to rotate said spring, and brake means toward the other end of the spring and channel operative on said spring adapted to maintain the spring in a wound condition while rotating.

2. A conveyor comprising a rotatable coil spring, a guide channel embracing said spring, driving means connected with said spring near one end thereof adapted to rotate it around its axis in said channel, and a brake near the other end of the spring, said brake having a first resisting element stationary with respect to the channel and a second rotatable element connected with said spring.

3. A conveyor according to claim 2, wherein said first stationary element of the brake is constituted by a frictional surface and its second rotatable element is constituted by another frictional surface engageable with the first frictional surface, said spring being tensioned between said driving means and said second rotatable braking element, and being thereby adapted to force said second braking element into frictional engagement with said first stationary braking element under conditions of rotation of the spring by said driving means.

4. A conveyor comprising a single, interiorly empty rotatable coil spring having substantial clear spaces between its coiled loops and a clear space within its loops, a guide member for the spring comprising a vertical supporting flange and an upper channel embracing the spring throughout more than 180° and providing a slot substantially exposing upwardly looped clear spaced portions of said spring, whereby articles resting upon the marginal portions of the slot may extend into the clear spaces and thereby be transported upon spring rotation, overhead means attached to said flange adapted to support said member substantially horizontally, said member being stiff enough to be supported as a beam with said articles thereon but adapted to be transversely deformed into curved beam shapes, means at one end of said spring adapted to drive it, and brake means operative upon the other end of the spring adapted to hold it in wound tension while rotating.

References Cited in the file of this patent
UNITED STATES PATENTS

| | | |
|---|---|---|
| 1,779,148 | Saunier | Oct. 21, 1930 |
| 2,573,334 | Hitz | Oct. 30, 1951 |
| 2,620,917 | Dahlberg | Dec. 9, 1952 |